United States Patent
Phipps et al.

(10) Patent No.: US 6,971,852 B2
(45) Date of Patent: Dec. 6, 2005

(54) METHOD OF AND STRUCTURE FOR ENABLING COOLING OF THE ENGAGING FIRTREE FEATURES OF A TURBINE DISK AND ASSOCIATED BLADES

(75) Inventors: Anthony B. Phipps, Uttoxter (GB); Lynne Turner, Bristol (GB)

(73) Assignee: Rolls-Royce PLC, London (GB)

( * ) Notice: Subject to any disclaimer, the term of this patent is extended or adjusted under 35 U.S.C. 154(b) by 77 days.

(21) Appl. No.: 10/792,806

(22) Filed: Mar. 5, 2004

(65) Prior Publication Data
US 2004/0191067 A1  Sep. 30, 2004

(30) Foreign Application Priority Data
Mar. 26, 2003  (GB) .................................... 0307043

(51) Int. Cl.[7] .............................................. F01D 5/08
(52) U.S. Cl. ...................... 416/1; 416/96 R; 416/97 R; 416/248
(58) Field of Search ...................... 416/1, 96 R, 97 R, 416/248

(56) References Cited

U.S. PATENT DOCUMENTS 2,848,193 A * 8/1958 Sells et al. ..................... 416/92
3,501,249 A * 3/1970 Scalzo et al. .................. 416/95

FOREIGN PATENT DOCUMENTS

DE  1 076 446   2/1960
GB  1 209 419   10/1970

* cited by examiner

Primary Examiner—Ninh H. Nguyen
(74) Attorney, Agent, or Firm—Oliff & Berridge, PLC

(57) ABSTRACT

A gas turbine engine turbine section includes a turbine disk (20) which carries a stage of turbine blades (22). The turbine blades (22) have fir tree roots (24) which locate in fir tree grooves (26) in the rim of disk 20. Some of the projections that form the fir tree roots (24) of blades (22) and fir tree grooves (26) of disk (20) are truncated so as to define spaces between their truncated surfaces and the roots between adjacent overlapping projections, thus enabling the passing of a cooling air flow therethrough.

4 Claims, 2 Drawing Sheets

METHOD OF AND STRUCTURE FOR ENABLING COOLING OF THE ENGAGING FIRTREE FEATURES OF A TURBINE DISK AND ASSOCIATED BLADES

It is well known to form grooves that have "V" shaped profiles in and around the rim of a turbine disk, and to further groove the walls thereof so as to form a fir tree profile. The roots of turbine blades that are to be assembled around the disk have identical fir tree profiles formed thereon, and assembly is achieved by sliding the roots of the blades into respective grooves in the disk rim, in a direction near axially of the turbine disk. The blades are thus prevented from flying out of the disk when the turbine disk rotates during operation in an associated gas turbine engine.

It is also known, to arrange the proportions of the blades roots with respect to the disks roots, so as to define a space between the inner end of the blades roots and the bottom of their associated disk grooves, and further, to provide a passage in each blade, which passage connects the interior of the blade with a respective space. During operation of the associated gas turbine engine, air is bled from an associated compressor and ducted to the spaces, from which the air flows into the blade passage, and thence to the interior of the blade aerofoil, so as to cool it. Thereafter, the air exits the aerofoil via holes in its flanks, into the gas annulus.

Whilst the known art achieves appropriate cooling of the blade aerofoils, it has no efficacy when circumstances demand cooling of the blade roots and turbine disk rim portion, as arises when turbine operating temperatures rise, and, in the search for ever increasing operating efficiency, there results a reduction in availability of compressor air for use as a cooling agent.

The present invention seeks to provide an improved method of cooling the joining structure of a turbine disk and associated turbine blades.

The present invention further seeks to provide a turbine disk and associated turbine blades joined in a manner enabling cooling of their joining structure during operation in an associated gas turbine engine.

According to one aspect of the present invention, a method of enabling cooling of the engaging fir tree features of a turbine disk and blades during operation of the assembly in a gas turbine engine, comprises the steps of truncating the tips of at least one pair of circumferentially spaced projections that with others define said fir tree shapes, in said disk and/or on said blades, so as to define cooling air flow paths between the truncated tips of the one and the opposing fir tree roots of the other when said disk and blades are assembled, and connecting said cooling air paths to a compressor of said gas turbine engine for the receipt of a supply of cooling air therefrom during operation of said engine, enclosed annular spaces being provided adjacent the upstream and downstream faces of said assembly and connecting said compressor air supply to said truncation defined spaces via said upstream face for passage therethrough to said downstream face, each blade of the assembly being provided with a cooling air passage through a substantial portion of its length, the cooling air inlet of which passage is in the radially inner end of said blade, and connecting at least the downstream adjacent space in flow series with said cooling air inlet so as to enable a circulatory flow to be established.

The invention will now be described, by way of example and with reference to the accompanying drawings, in which.

Figure 1:
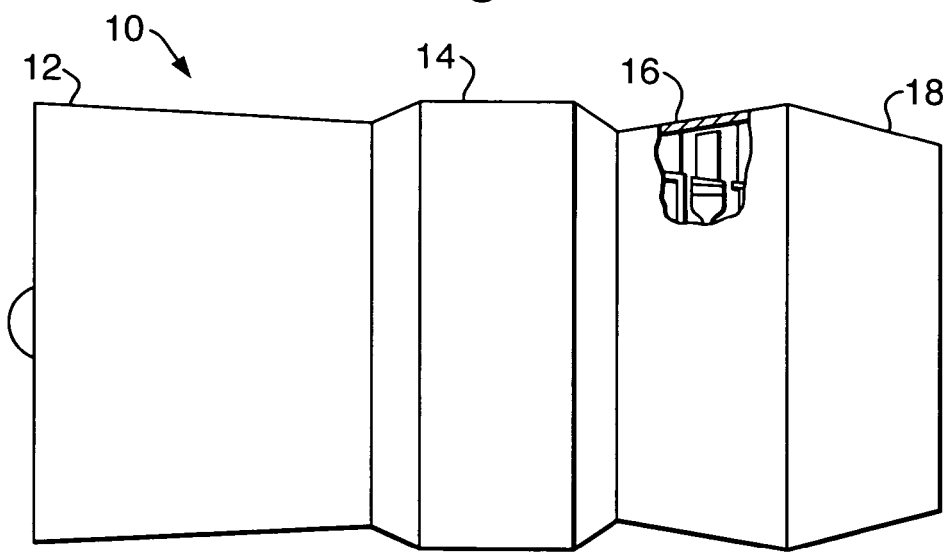
FIG. 1 is a diagrammatic sketch of a gas turbine engine including a turbine disk and blade assembly in accordance with the present invention.

Referring to FIG. 1. A gas turbine engine 10 has a compressor 12, combustion equipment 14, a turbine section 16, and an exhaust duct 18.

Figure 2:
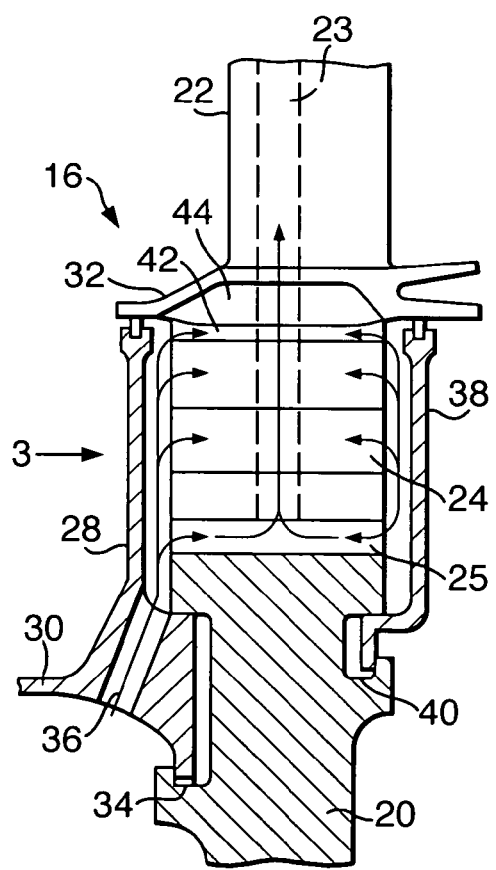
FIG. 2 is an enlarged view of the exposed interior of the turbine section in FIG. 1.

Referring now to FIG. 2. The turbine section 16 includes a turbine disk 20, to which a stage of turbine blades 22 is fitted, only one of which is shown. Blades 22 are provided with fir tree roots 24, best seen in FIGS. 3 to 5, and locate in respective complementary fir tree grooves 26 in the rim of disk 20, again best seen in FIGS. 3 to 5. Each turbine blades 22 has a cooling air passage 23 extending through most of its length, the radially inner end of the passage 23 being open to a space 25 between the radially inner end of the blade 22 and the bottom of the groove 26. During operation of engine 10, compressor air is fed to space 25 and flows up passage 23 into the interior of the aerofoil portion of blade 22, and thence to the turbine annulus in known manner.

A flange 28 formed on a stub shaft 30 locates between the undersides of the platforms 32 of blades 22 and an annular groove 34 formed on the upstream face of disk 20. Flange 28 covers the fir tree engaging features 24 and 26, but is spaced therefrom so as to allow entry of cooling air from compressor 12 via equi angularly spaced holes 36 in stub shaft 30 during operation of engine 10. An annular cover plate 38 is similarly located between the platforms 32 of blades 22 and an annular groove 40 formed on the downstream face of disk 20, so as to cover the fir tree engaging features 24 and 26 in spaced relationship therewith.

Figure 3:
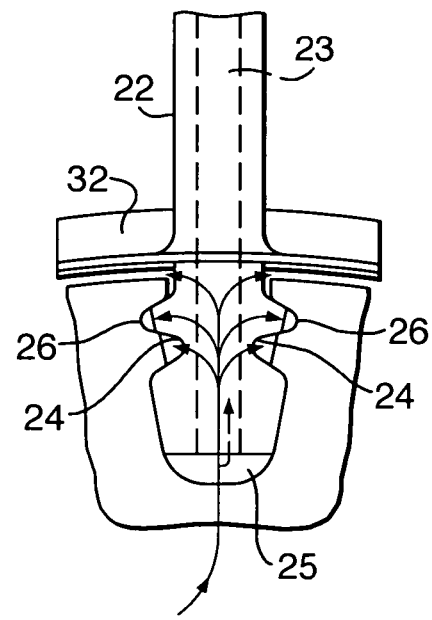
FIG. 3 is a view in the direction of arrow 3 in FIG. 2.

Referring briefly to FIG. 3 in which flanged stub shaft 30 is omitted for clarity. Here it is seen that the opposing projections that define the fir tree profile on the roots 24 of blades 22 are truncated, as are the projections that define the fir tree profile of the grooves 26. By this means, spaces are formed therebetween which extend from the upstream faces of disk 20 and blade roots 24, to their respective downstream faces, thus providing cooling air flow paths that connect the respective spaces enclosed by flange 28 and cover plate 38.

Referring back to FIG. 2. During operation of engine 10, compressor 12 (FIG. 1) delivers cooling air to the space defined by flange 28 and disk and blade assembly 20 and 22. Some of the air enters space 25 and flows up passage 23. The remainder traverses the face of disk 20 in a radially outwardly direction, most entering the spaces provided by the truncated fir tree projections as they are reached, and flowing therethrough to the space defined by the disk and blade assembly 20 and 22, and cover plate 38. The balance enters a small radial gap 42 between the rim of the turbine disk 20 and the underside of the platform of blade 22, and then into the space between the disk and blade assembly and cover plate 38. The air then enters space 25 prior to flowing into passage 23, thus establishing a circulatory flow as indicated by arrows. If necessary, the appropriate magnitude of the small gap 42 can be achieved by the provision of a fabricated plate 44 fastened to the underside of platform 32.

Figure 4:
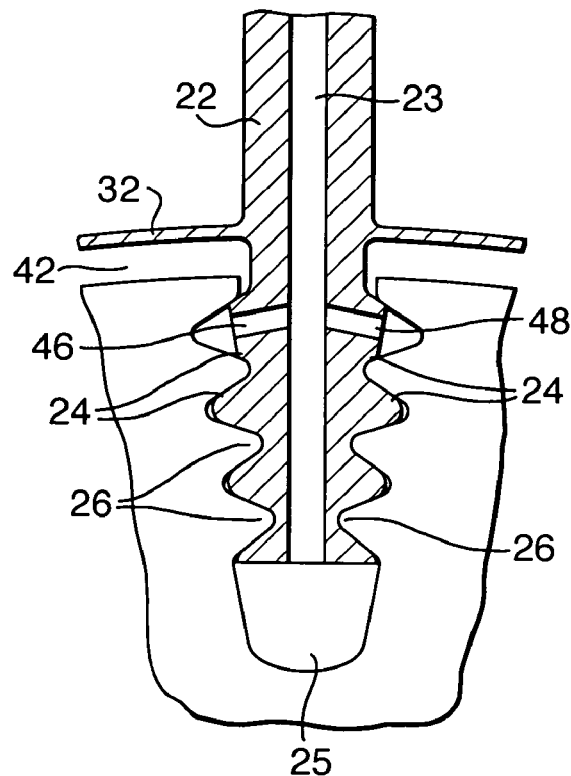
FIG. 4 depicts an alternative arrangement incorporating the present invention.
Figure 5:
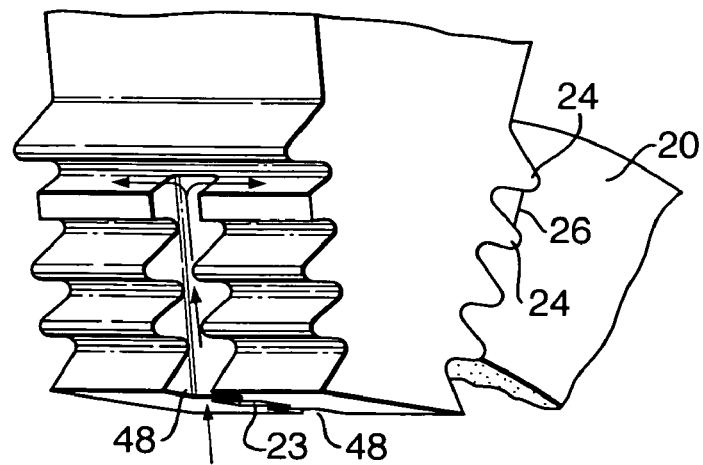
FIG. 5 is a further alternative arrangement incorporating the present invention.

Referring now to FIG. 4 in which like parts are given like numbers. In this example, only the radially outer pair of opposing projections 24 on the blade root are truncated, and cooling air is taken to the spaces they define, straight from passage 23 via branch passages 46 and 48. In such an arrangement, cover plate 38 will be utilised as in FIG. 2 but flange 28 will be modified so as to blank off all of the upstream face of disk 20 except those parts needed to enable entry of cooling air into space 25.

Referring now to FIG. 5 in which, again, like parts are given like numbers. The radially outermost two pairs of opposing fir tree projections of blade root 24 straddle the truncated, opposing pair of fir tree projections in the disk groove 26, next but one to the disk rim projection, thus defining cooling air flow passages as described hereinbefore. In this example, the cooling air reaches the passages via opposing slots 48 formed in and through all of the fir tree projections on blade root 24. Again, cover plate 38 (FIGS. 2 and 4) will be utilised as described with respect to those figures, and flange 28 will be utilised as described in connection with FIG. 4.

The expert in the field, having read this specification, will realise that, although any or all of the opposing fir tree projections on blade root 24 and in disk groove 26 can be truncated to provide cooling air flow paths, the most efficient cooling of the blade roots and turbine disk rim will be achieved by the arrangements described and illustrated herein.

What is claimed is:

1. A method of enabling cooling of the engaging fir tree features of a turbine disk and blades during operation of the assembly in a gas turbine engine comprising the steps of truncating the tips of at least one pair of circumferentially spaced projections that with others define said fir tree shapes, in at least one of said disk and on said blades, so as to define cooling air flow paths between the truncated tips of the one and the opposing fir tree roots of the other when said disk and blades are assembled, and connecting said cooling air flow paths to a compressor of said gas turbine engine for the receipt of a supply of cooling air therefrom during operation of said engine, enclosed annular spaces being provided adjacent the upstream and downstream faces of said assembly and connecting said compressor air supply to said truncation defined spaces via said upstream space, for passage therethrough to said downstream space, each blade of the assembly being provided with a cooling air passage through a substantial portion of its length, the cooling air inlet of which passage is in the radially inner end of said blade, and connecting at least said downstream adjacent space in flow series with said cooling air inlet so as to enable a circulatory cooling flow to be established.

2. A method of enabling cooling of the engaging fir tree features of a turbine disk and blades as claimed in claim 1 including the step of connecting the upstream adjacent space in flow series with said blade cooling air inlet.

3. A method of enabling cooling of the engaging fir tree features of a turbine disk and blades as claimed in claim 1 including the steps of providing each blade of the assembly with a cooling air passage through a substantial portion of its length, the cooling air inlet of which passage is in the radially inner end of said blade, and further providing branching passages that extend laterally of and from said cooling air passage, and connect with spaces defined by said truncated fir tree projections.

4. A method of enabling cooling of the engaging fir tree features of a turbine disk and blades as claimed in claim 1 including the steps of providing each blade of the assembly with a cooling air passage through a substantial portion of its length, the cooling air inlet of which passage is in the radially inner end of said blade, and further providing cooling air channels in the fir tree projections of either the blades roots or the disk groove, in a direction normal to the lengths of said projections and which terminate in spaces defined by said truncated fir tree projections.

* * * * *